United States Patent
Housel, III

(12)
(10) Patent No.: US 6,535,869 B1
(45) Date of Patent: Mar. 18, 2003

(54) INCREASING EFFICIENCY OF INDEXING RANDOM-ACCESS FILES COMPOSED OF FIXED-LENGTH DATA BLOCKS BY EMBEDDING A FILE INDEX THEREIN

(75) Inventor: Barron Cornelius Housel, III, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/274,669

(22) Filed: Mar. 23, 1999

(51) Int. Cl.[7] .............................................. G06F 17/30
(52) U.S. Cl. .............................. 707/2; 707/100; 707/3; 707/4; 707/8; 707/200
(58) Field of Search ............................... 707/100, 8, 2, 707/4, 1–3, 200

(56) References Cited

U.S. PATENT DOCUMENTS 5,806,065 A * 9/1998 Lomet ............................ 707/8
5,842,196 A * 11/1998 Agarwal et al. ................ 707/2
5,991,776 A * 11/1999 Bennett et al. ............... 707/205
6,026,406 A * 3/2000 Huang et al. ................. 707/100
6,047,285 A * 4/2000 Jacobs et al. .................. 707/4
6,070,164 A * 5/2000 Vagnozzi ..................... 707/100

\* cited by examiner

*Primary Examiner*—Kim Vu
*Assistant Examiner*—Cam Y Truong
(74) *Attorney, Agent, or Firm*—Jeanine S. Ray-Yarletts; Marcia L. Doubet

(57) ABSTRACT

A method, system, and computer-readable code for embedding a file index among the fixed-length data blocks of a random-access file to which the index pertains. In the preferred embodiment, a B-tree index is used. The nodes of the B-tree are stored using blocks of the random-access file, so that the index records are embedded among the data records to which the index pertains. This technique avoids a number of problems that result when a data file and its index are separately located. Record updates and retrievals operate more efficiently, and the data records remain synchronized with the corresponding index when file operations (e.g., close, flush) complete successfully. In an optional enhancement, synchronization is ensured when record-level operations (write, delete) complete successfully.

24 Claims, 9 Drawing Sheets

Fixed Block Store With a Single Embedded Index and Variable-length Data Records

INCREASING EFFICIENCY OF INDEXING RANDOM-ACCESS FILES COMPOSED OF FIXED-LENGTH DATA BLOCKS BY EMBEDDING A FILE INDEX THEREIN

BACKGROUND OF THE INVENTION

1. Field of the Invention

The present invention relates to a computer system, and deals more particularly with a method, system, and computer-readable code for embedding a file index within a data file to which the index pertains.

2. Description of the Related Art

File indexing is well known in the computer art, and provides a technique for randomly accessing data from a file in order to locate data in the file more quickly than would be possible using a sequential search. A file index typically consists of entries containing (1) some type of key value that enables identifying a particular record in the file, and (2) an address that can be used to locate that record on a storage medium. Records in the file are then accessed by searching the index using the key value, and retrieving the associated record address. The key value used may be a value that is uniquely associated with, and forms a part of, each record from the file (such as an employee number in a file of employee records). Or, the key value may be computed using a mathematical algorithm to generate a result that is uniquely associated with a file record. This key generation technique is referred to as "hashing", and many approaches to hashing are known in the art.

Many different approaches to structuring file indexes are also known in the art. Different structures provide different time estimates for average record retrieval, insertion, and deletion, as well as best case and worst case time estimates. One such index structure is a hash table, which is used with the hashed key values discussed above. Or, various tree structures may be used for a file index. When using a tree structure, each node of the tree typically contains some number of key values and other information related to the keys. As an example of the type of other information, some nodes will contain pointers that must be traversed further when searching for a particular key; other nodes will contain the record address for the record associated with that key (or a pointer to the stored record). Types of tree-structured indexes known in the art include B-trees, tries, B*-trees, and B'-trees. Differences among these tree structures include: how many key values can be stored in a node, whether full or partial keys are stored in the nodes, and whether record addresses are stored in intermediate nodes or only in leaf nodes of the tree. (The specific details of implementing these various tree structures, and advantages thereof, may be found in a data structures reference such as Chapters 7 and 8 of "Algorithms and Data Structures in C++", Leendert Ammeraal, published by John Wiley and Sons (1996).)

Random-access files are typically stored on a persistent storage medium such as a disk drive. When an executing program needs to access a record located in the file, a portion of the stored disk file containing the record is read into memory. (Typically, a "page" of data is read into memory, where a page is 4096 bytes of data.) If the record is updated by the executing program, then the changed information must be rewritten to persistent storage when the updates are complete. The changed information may be rewritten in the same location where the prior version of the record was stored, or it may be written to a new location. (For example, if the updated record is now larger than the version it replaces, it may be necessary to move the record to a new storage area that can accommodate the larger record.) Moving the location of the record requires changing the record address information in the file index. When a record is to be added to a file, a file manager facility is consulted to locate available free space within the file. The new information is written into an area allocated by the file manager, and an entry for this new record is created in the file index. When a record is to be deleted from a file, the file manager deallocates the file space the record was using, and the entry for the deleted record must be removed from the index. These concepts are known in the art, and file management facilities are readily available.

As can be seen from the discussion above, making changes to records stored in a file (whether through updates, additions, or deletions) requires not only changing the stored record but also typically requires changes to the file index. A file and its index must be kept precisely synchronized as these changes occur, to preserve the integrity of the data. For example, suppose a record is to be deleted from a file. If the deletion completes successfully, but some type of error condition (such as a system failure due to hardware and/or software problems) occurs before the corresponding key is removed from the index, the index no longer accurately represents the stored file. Similarly, if a data record is added to a file but the index is not properly updated with the new record's key, the files are not synchronized and it is not possible to locate the new record using the index. Because updating a file on persistent storage is normally an expensive operation in terms of computing time, file revisions are typically made in a batch mode. In this approach, a number of revised records are kept in faster memory storage until some point in time, and then the entire group or batch of revisions is written to the persistent store at the same time. While this batch approach minimizes the overhead required for revising records, the higher number of records involved results in an increase in the potential for inconsistencies between the data file and its index, should an error occur. Known solutions for dealing with these types of data integrity problems include using transaction processing techniques, where the updating of both the data file and the index file is treated as a single atomic transaction. The updates are only "committed" (i.e. made permanent) to the persistent store if the entire update process completes successfully; otherwise, the updates to both the data file and the index are "rolled back" (i.e. discarded) as a group.

Providing program logic to detect and/or recover from a mismatch between a data file and its index is complex and error-prone. However, inefficiencies in program operation when storing a file and its index separately may occur even in the absence of error conditions. For example, separate allocation requests must be made when creating a data file and its index file. Similarly, when the file is no longer needed, separate deallocation requests must be made for the file and its index. Further, the separate physical locations of the data file and its index on the storage medium may cause processing inefficiencies. This is because accessing an index by an executing program is closely tied to accessing the corresponding data file: normally when a record update or retrieval occurs, the index is accessed and then the data file is accessed. This sequence is then repeated for the next record update or retrieval. If the data file is not stored physically near the index, the storage medium may exhibit thrashing behavior as the read/write mechanism moves back and forth between the two storage areas. Further, if the record address stored in the index is returned to a program, compaction of the data file (so that all unallocated blocks will be located at the end, for example) becomes complicated and error-prone because it may not be possible to determine when such record addresses cease being used by the program. Compaction of the data file requires rebuilding its associated index, so that a record's key entry will then be associated with its new location. If a program continues using a record address that it received prior to the compaction process, it will likely be referring to data other than what it expects (with a high probability of program failure as a result).

Accordingly, what is needed is a technique which avoids the problems discussed above. The present invention addresses these problems by providing a novel solution whereby a file index is embedded within the data file to which it corresponds.

SUMMARY OF THE INVENTION

An object of the present invention is to provide a technique whereby a data file can efficiently remain synchronized with its corresponding index.

Another object of the present invention is to provide a technique whereby data integrity between a data file and its index is automatically preserved when a file checkpoint succeeds, and recovery/restart complexity is minimized.

Still another object of the present invention is to provide a technique whereby physical access time for accessing data file records in persistent storage is minimized.

It is another object of the present invention to provide a technique whereby data file compaction can occur with minimal risk of inaccurate location references by executing programs.

Yet another object of the present invention is to provide these benefits by embedding a file index within the data file to which it corresponds.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process, a system, and a method for use in a computing environment, for increasing efficiency of indexing random-access files. This technique comprises: storing data records in a random-access file, where the file comprises a control area and a plurality of fixed-length block and wherein each of the data records is stored as one or more of the fixed-length blocks; creating an embedded index for the file, wherein the index is stored as one or more of the fixed-length blocks; updating the index; and using the index to retrieve a selected one of the stored records. This technique may further comprise: allocating an index control area for the index within the control area of the random-access file; and storing an address of the index in the index control area. Preferably, the process of updating the index is invoked each time the storing process completes successfully, and the process of updating the index further comprises: computing a key value for the data record; storing the computed key value in a key object; storing an address where the data record was stored in the key object; and inserting the key object into the index; and the technique further comprises deleting the stored data record from the file if the inserting step encounters an error. Using the index step preferably further comprises: comparing selected ones of the inserted key objects to a record key of the selected record; returning a not-found indication when none of the selected key objects contains the record key; and reading the selected record from the random-access file using the stored address in a matching one of the selected key objects when the matching one contains the record key. The technique may further comprise deleting a particular record from the random-access file, which further comprises: removing an associated key object from the index; and deallocating one or more blocks associated with the particular record. The index may be a tree-structured index, which may be a B-Tree index. In an optional aspect, the technique may further comprise: creating a first write-prepare record to store information related to the storing; creating a second write-prepare record to store information related to the updating; storing the first and second write-prepare records in a persistent prepare store; resetting the prepare store when the storing and updating complete successfully; and restoring the file when a file error occurs. In another optional aspect, the technique may further comprise: creating a first delete-prepare record to store information related to the deallocating; creating a second delete-prepare record to store information related to the removing; storing the first and second delete-prepare records in a persistent prepare store; resetting the prepare store when the deallocating removing complete successfully; and restoring the file when a file error occurs.

The present invention will now be described with reference to the following drawings, in which like reference numbers denote the same element throughout.

DESCRIPTION OF THE PREFERRED EMBODIMENT

Figure 1:
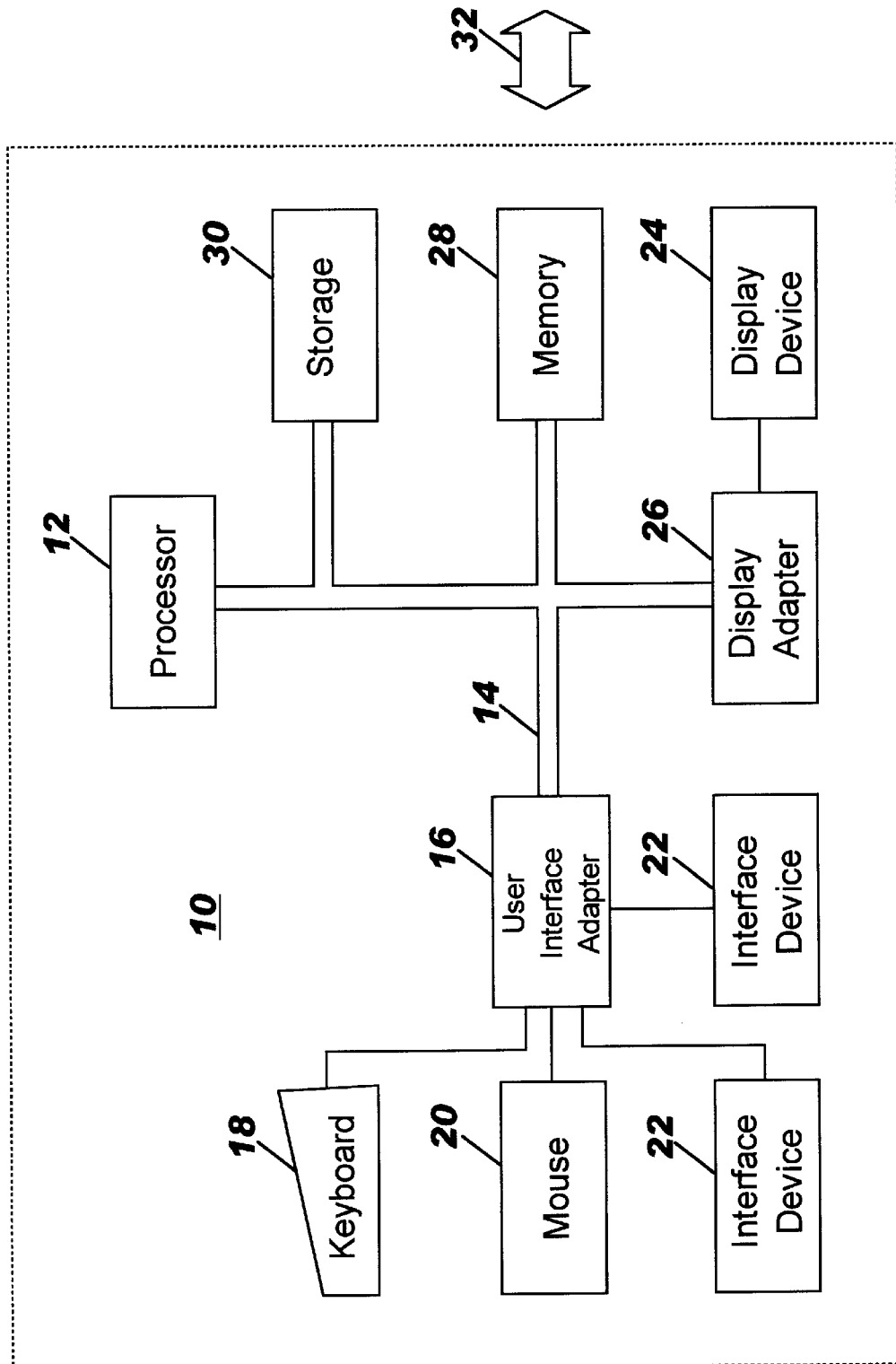
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
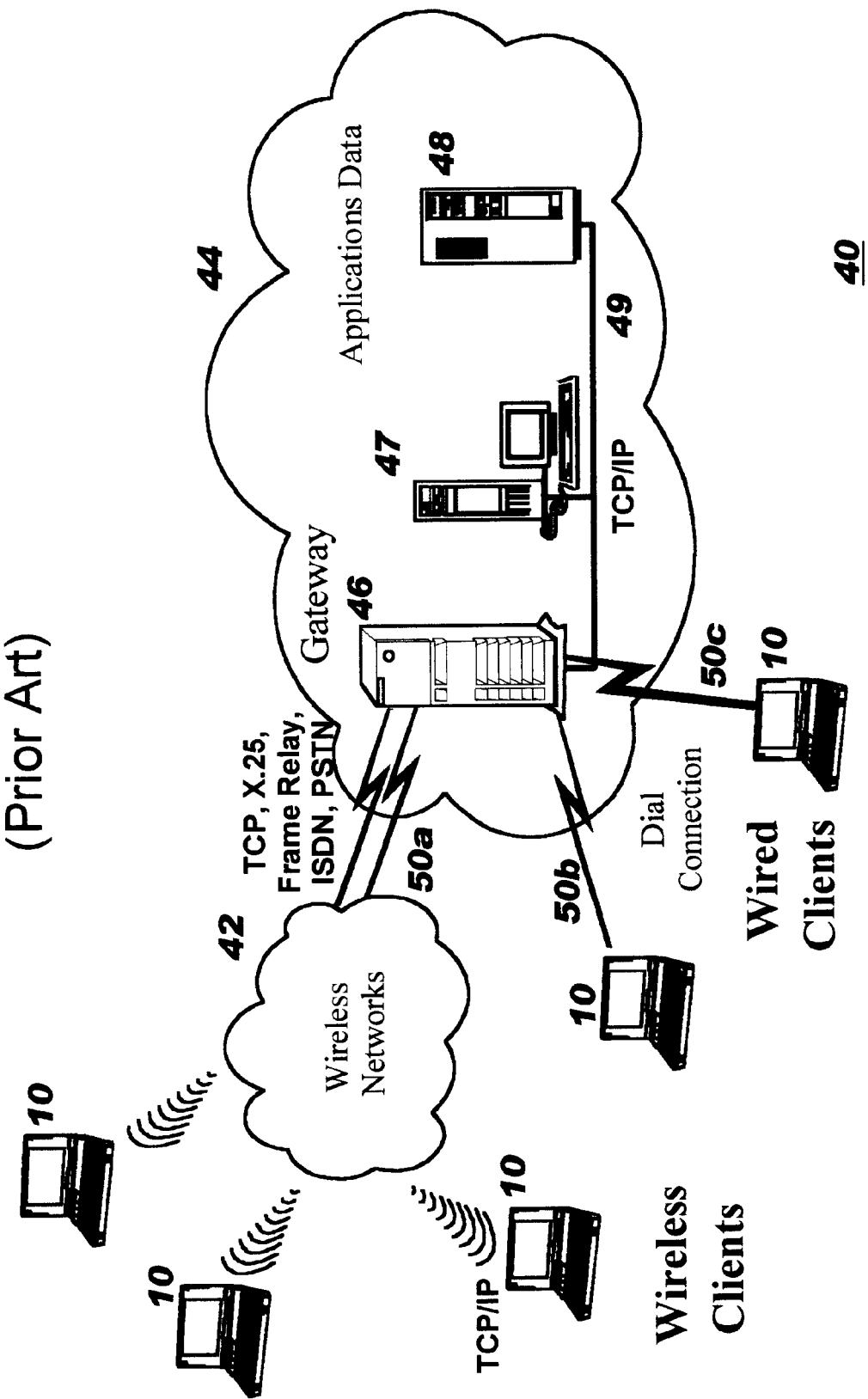
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a data server in a network using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The software of the present invention may operate on a user's workstation, as one or more modules (also referred to as code subroutines, or "objects" in object-oriented programming) which are invoked upon request. Alternatively, the software may operate on a data server in a network. The description of the preferred embodiment uses object-oriented programming concepts (such as classes and methods) which are well known to those of ordinary skill in the art. However, the present invention may equivalently be implemented in a conventional procedure-oriented programming language. The logic implementing this invention may be integrated within the code of an application program, or it may be implemented as one or more separate utility objects or modules which are invoked by that application, without deviating from the inventive concepts disclosed herein. The application may be executing in a Web environment, where a Web server provides services in response to requests from a client connected through the Internet. Or, the application may be executing in a corporate intranet or extranet, or in any other network environment. Configurations for the network environment include a client/server network, as well as a multi-tier environment. These environments and configurations are well known in the art.

As is known in the art, variable-length records are accommodated in file stores which use fixed-length blocks by allocating a variable number of such blocks. The blocks comprising the variable-length record are viewed as logically contiguous, even though they may be physically separated. This appearance of contiguous location is achieved by chaining the blocks of a record together. In other words, each block contains a pointer that identifies the next block of the record, where the pointer in the last block indicates that there are no further blocks. The address of the record is typically the address of the first block in the chain.

The present invention provides for embedding a file index within the same data store that is used for storing variable-length data records. In the preferred embodiment, a B-tree structure is used for the embedded file index; however, other structures such as those that have been previously described (B* trees, hashed indexes, etc.) may be used without deviating from the inventive concepts disclosed herein. A B-tree comprises nodes in which key values and other information related to records is stored, as previously discussed. The embedded B-tree index of the present invention is embedded within a data file of fixed-length blocks using one such block for each node of the B-tree (as will be discussed in more detail below with reference to FIG. 4).

A number of advantages are gained through use of the present invention. Because the index and data file are physically within the same file, all global operations (i.e. operations that apply to the entire file, such as opening the file, closing the file, allocating and deallocating, flushing or checkpointing the file, etc.) automatically apply to both types of information. This preserves the integrity of the information, as the techniques defined herein maintain the synchronization of the information, and minimizes the complexity involved with restart and recovery procedures. In addition, fewer file operations (allocate, open, etc.) are required because a single file is used. Seek time for accessing the persistent store will most likely be less than if separate files were used, because the index records and data records reside within the same physical file. Further, the complexity of performing compaction on the file is reduced, because the physical record addresses of the data records do not need to be exposed outside the file itself. That is, programs using the data records will not use a physical address, but will use a logical address that defines a unique identifier of the record within the file. As the records move during a compaction operation, the physical address may change to represent the record's new location. The physical and logical address will be stored as part of the key object in the index. When the program subsequently references the record by its logical address, the index will be used to access the record. Another advantage of the present invention may be realized through reduction of disk access times because of the locality of references to the stored data and its index. Using the present invention, index blocks will tend to be evenly distributed with data blocks throughout the file. (A new index entry will tend to be added following the most-recently-added data blocks, where the free space in the file typically begins, and preceding the data blocks to which this new index entry applies.) Thus, the previously-discussed inefficiencies that may result when retrieving data from disk storage when an index is stored physically distant from its associated data will be avoided.

A number of terms that will be used hereinafter in discussing the present invention will now be introduced.

Figure 3:
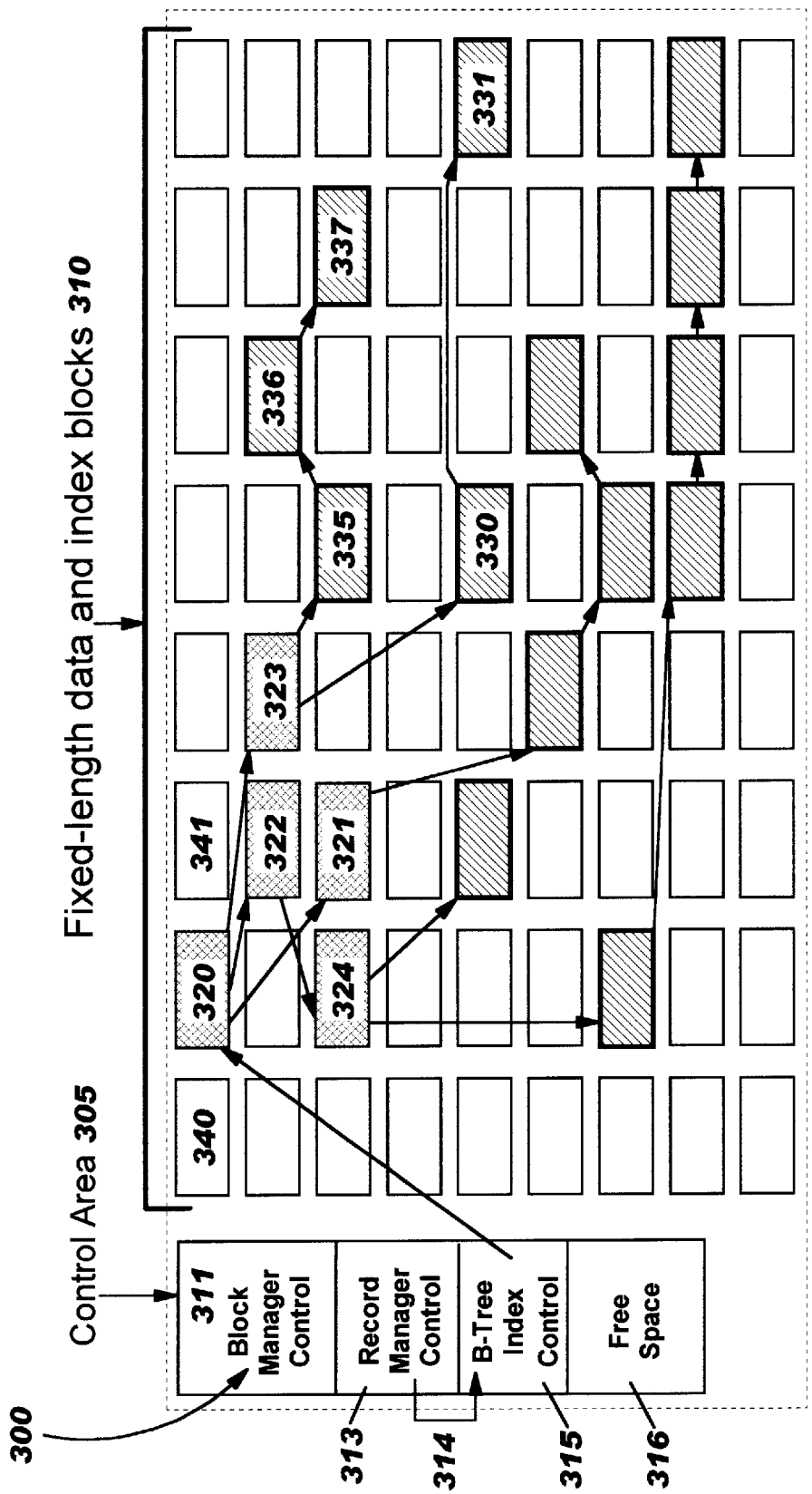
FIG. 3 illustrates an example of a fixed-length data block store in which an index has been embedded among variable-length data records according to the present invention.

BlockManager: In an object-oriented implementation, an object comprised of attributes and methods for managing a random-access file comprised of a set of fixed-length data blocks (as depicted in FIG. 3). BlockManager has file methods to open, close and flush (i.e. copy in-memory changes to persistent store) the file. The parameters for allocating a file are: (1) the store (file) name, (2) the block length (BL), and (3) the number of blocks (NB). BlockManager also has block methods for allocating, deallocating, reading, and writing a data block.

Store: Persistent storage (e.g. a disk file on a disk drive) that comprises: (1) a Control Area (CA) used to record state information about the store and (2) n fixed-length blocks of length k bytes. The control area is used by BlockManager to save persistent state information. In addition, space in the control area can be allocated to other objects that use the store (e.g., RecordManager, Index).

RecordManager: The class RecordManager is a subclass of the base class BlockManager, and defines an object comprised of attributes and methods for managing a set of variable-length records (i.e. it adds record-handling semantics to the block semantics of BlockManager). Each record is stored as one or more BlockManager blocks. RecordManager has (1) record methods: allocate, deallocate, read, and write, and (2) file methods: open, close, and flush. Each record written to the store has a record address (RA). The RA is typically the number of the first block of a variable-length record.

In addition, RecordManager contains a method: registerIndex. This method registers an index object with the RecordManager object, and is used by the present invention to provide the connection between indexes and records so that the indexes can be appropriately updated when a record is created, deleted, or updated. This method is implemented by storing a pointer in the RecordManager which points to the object being registered.

Record Store: An instance of a block store created by RecordManager that stores variable-length records. A record store is a persistent store as described above; however, the data blocks and the control area contain the necessary control information for managing variable-length records (pointers to subsequent blocks in a record and a record manager control area, respectively).

BTREE Index: A persistent B-tree index that is allocated within a store. A B-tree object B is created using the method: BTREE (RecordManager recordStore, KEY key), where recordstore is a reference to a record manager instance that is bound to a persistent store instance. The parameter key defines the index key object that will be used with this BTREE index. Keys are used to search the index to locate records. Each index key for a particular BTREE has a given key length (KL).

The preferred embodiment is discussed herein in terms of using a single primary index (i.e., an index where all keys in the index are unique). However, the present invention may also be used for files having more than one primary index, a primary index and one or more secondary indexes, or multiple primary and multiple secondary indexes, where each of the additional indexes is also stored within the same store containing the (first) primary index. Multiple primary keys (and therefore multiple primary indexes) may be used for data that may be accessed in different manners. For example, suppose that Web page content is retrieved from the Internet and stored in a file cache to enable quick access to the page content. One natural way to access this cached data is by using the URL (Uniform Resource Locator) with which each page was retrieved from the Internet. Each URL uniquely defines a particular page (ignoring considerations of dynamic page content, which are not pertinent in this context), and thus may be used as a record key in an index. However, it may also be desirable to access these records using a different key, such as a hashed record key that will typically be much shorter than a URL. By choosing an appropriate hashing technique (such as computation of a "CRC", or cyclic redundancy check), the record keys used in the corresponding hashed index will also be unique. Secondary indexes, on the other hand, refer to the possibility of using keys in the index that are not unique—that is, a given key value may map to more than one data record. An example of accessing data records through a secondary index, using a secondary non-unique key, is locating all records within an employee file that use a particular department number within the record. This concept is analogous to foreign keys in relational databases.

Key: A class that defines an object stored in the entries of the BTREE index. There are many varieties of B-Trees, including B-trees, B*-trees, and B'-trees as discussed earlier. In some B-Tree varieties, each entry contains the key value (KV) (i.e. the search string) as well as the value to be returned if the key value is found. In other designs, the return values are stored only at the leaves of the tree. These details of techniques used in the alternative B-Tree structures are not pertinent to the present invention. However, to describe the preferred embodiment, we assume that each key entry in a BTREE node consists of a key object K with attributes KV and RA, where KV is the key value and RA is the address of the record instance that corresponds to the key value. When the index is a secondary index, the record address associated with the secondary key value will be the address of another index block that contains addresses of data records.

The preferred embodiment uses fixed-length keys, where the key length for a particular index is an attribute of the key object.

Returning now to the discussion of how the present invention operates, FIG. 3 illustrates a file store 300 created according to this invention, where a file index has been embedded among the data records of the file. This persistent store 300 comprises a control area 305 and a plurality of fixed-length blocks 310. Each of the fixed-length blocks may contain data or embedded index information, or may be empty (i.e. currently unused). Hatch marks have been used in FIG. 3 to depict index blocks (elements 320 through 324). An index control area 315, located in the control area 305, points to the root node (i.e. block) 320 of the index. Index block 320 is shown as pointing to further index blocks 321, 322, and 323, where index block 322 further points to index block 324. Accordingly, index block 322 is an intermediate node in a tree structured index, and blocks 321, 323, and 324 are leaf nodes of the index tree. Shading is used in FIG. 3 to represent data blocks. Index block 323 points to a first data block 330 and a second data block 335. Data block 330 farther points to data block 331, which itself does not point to any further data blocks. Thus, it will be apparent that block 330 is the first block of a two-block record, where node 331 is the second block. Similarly, block 335 is the first block of a three-block record which consists of blocks 335, 336, and 337. Blocks depicted as unfilled rectangles (e.g. 340, 341) represent unallocated blocks.

As illustrated in FIG. 3, blocks of a data record need not be contiguously stored (as is known in the prior art), and blocks for index entries may be intermingled with blocks for data records (such as data block 336 which appears physically between index blocks 323 and 324). This intermingling of data and index blocks within a file 300 is a novel concept of the present invention (although it may coincidentally happen in a particular case that all index blocks are located in one physical portion of the file 300 and all data blocks are located in a different physical portion of the same file).

Figure 4:
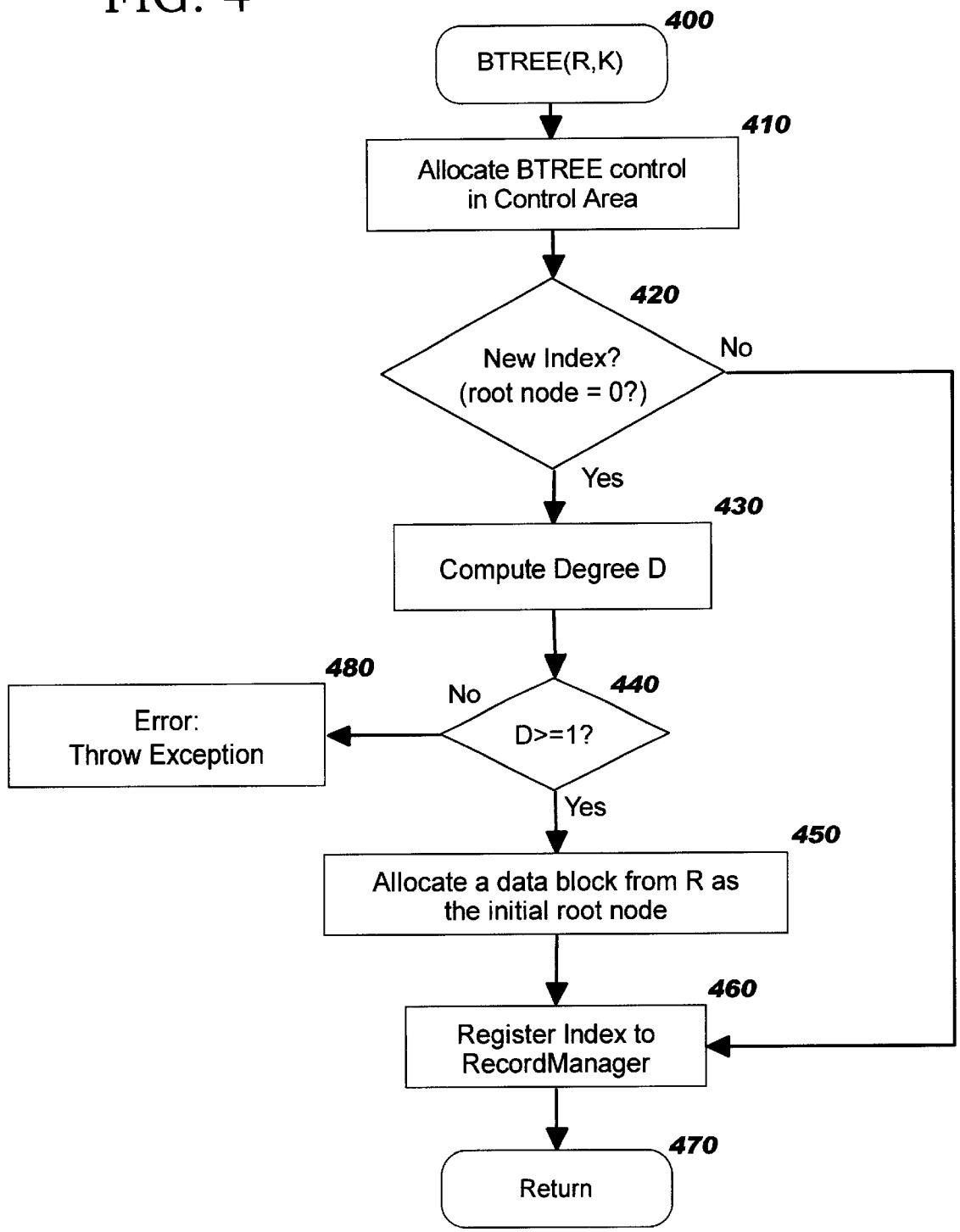
FIGS. 4–7 illustrate flow charts which set forth the logic which may be used to implement a preferred embodiment of the present invention.
Figure 5:
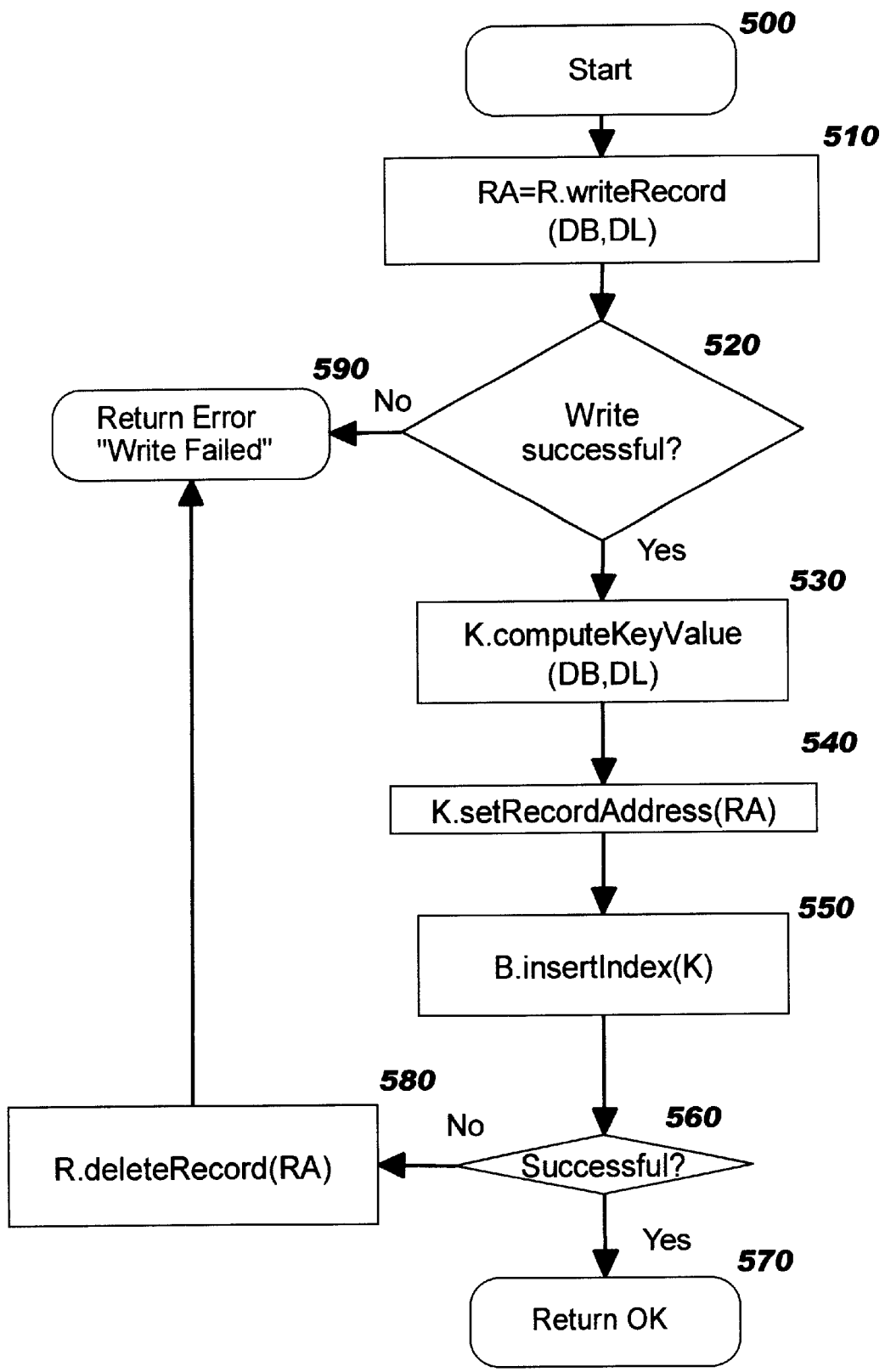
Figure 6:
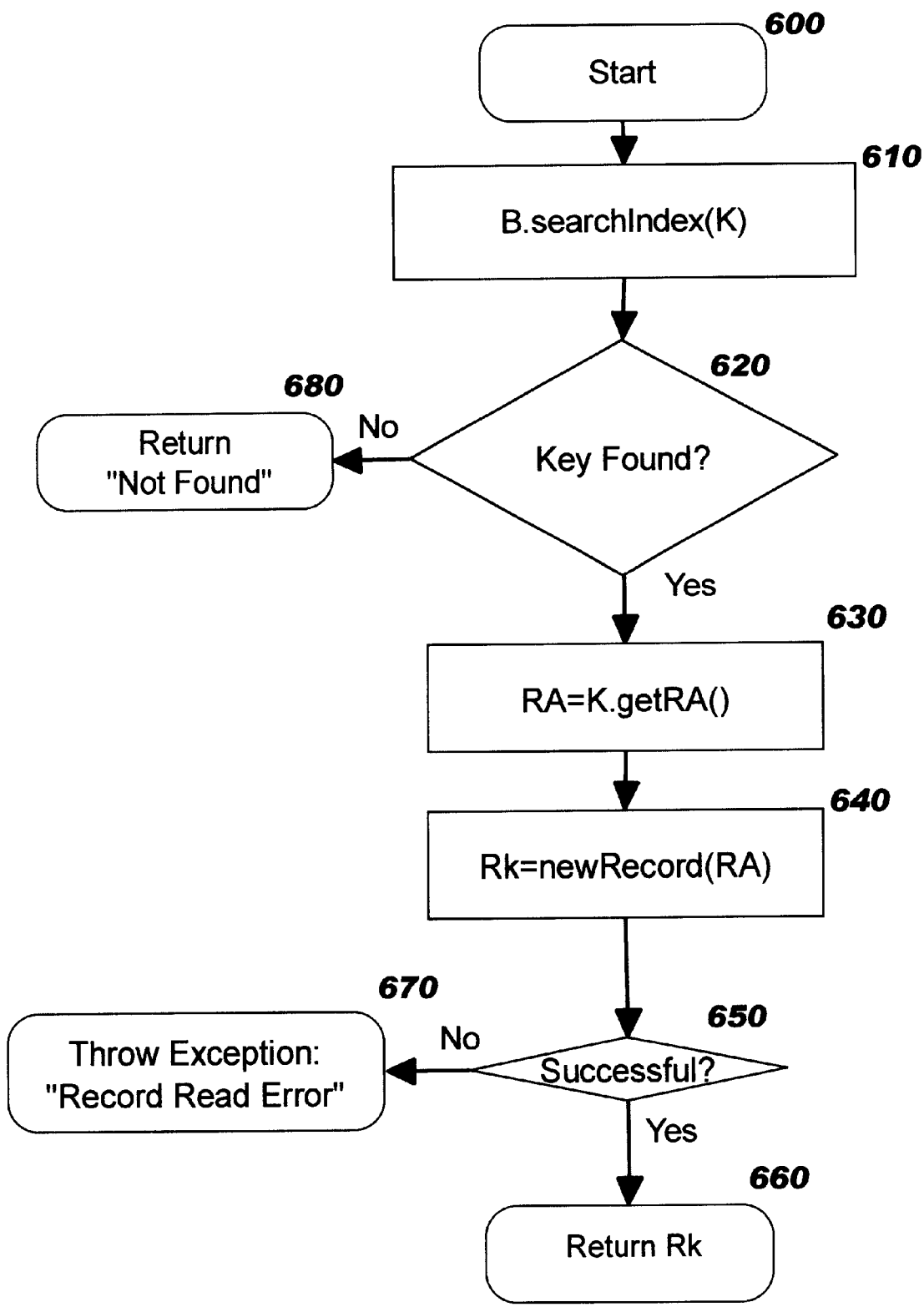
Figure 7:
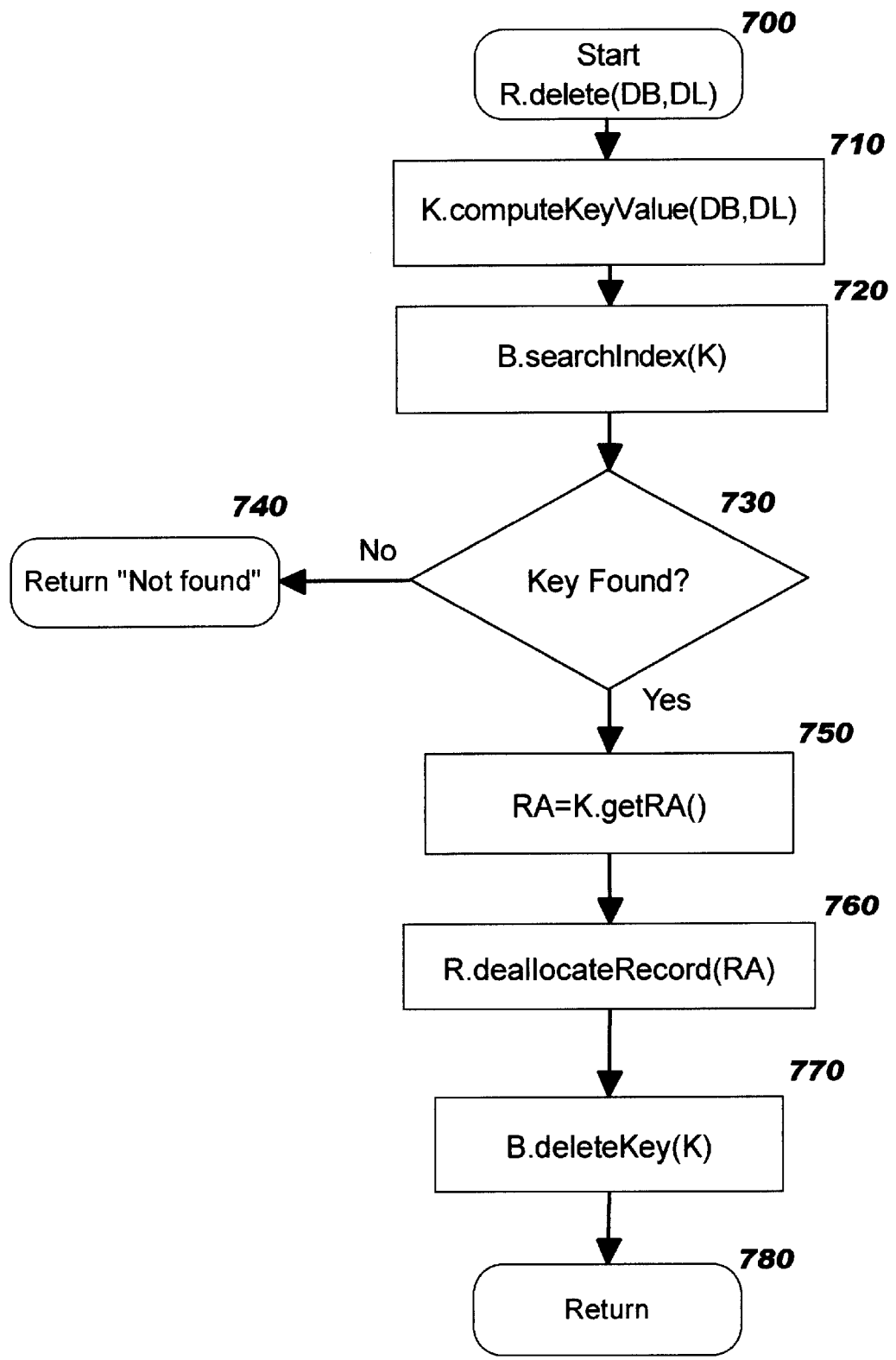

The manner in which the preferred embodiment of the present invention may be implemented will now be discussed with reference to the flowcharts in FIGS. 4 through 7. An optional enhancement of the preferred embodiment will then be discussed with reference to the flowcharts in FIGS. 8 and 9. These figures assume that the store has already been allocated, using file allocation techniques which are known in the art and do not form part of the present invention. Once the store (which corresponds to element 300 of FIG. 3) has been allocated, a number of operations are needed for using this store with its embedded index. Assume for purposes of discussion that the allocated store is a record store "R", having some number of blocks "NB", where each block is of fixed length "BL" (for block length). The operations on this store are defined by the present invention, and comprise: (1) allocating a B-Tree index within the allocated record store R; (2) updating the index when a record is written to R; (3) retrieving a record using the embedded index; (4) deleting a record from R and from the index; and (5) several related functions. The logic with which a B-Tree index is allocated according to the preferred embodiment is depicted in FIG. 4. FIG. 5 provides the logic for updating the embedded index. FIG. 6 provides the logic for using the embedded index to retrieve a record from the file. The logic for deleting a record is depicted in FIG. 7.

The process for allocating a B-Tree index within an allocated store R begins at Block 400 of FIG. 4. The preferred embodiment is described in terms of creating a single primary B-Tree index (depicted in the example of FIG. 3 as elements 320 through 324) to access these records by key. The syntax shown in Block 400 represents an invocation of the logic of FIG. 4, and indicates that the index constructor method to establish the BTREE index uses the record store "R", which is accessed by keys according to key object "K".

Before invoking the process of FIG. 4, a RecordManager instance is instantiated which, as stated above, is a subclass of the BlockManager class and is an object that manages a set of variable-length records (such as those depicted at element 310 of FIG. 3) in a persistent store 300. This is performed by invoking the RecordManager's constructor method, which first allocates space 313 for itself in the control area 305. The control area 305 is initially allocated large enough so that state information can be maintained for the BlockManager 311 (the required minimum contents for control area 305) and all subclasses of BlockManager (shown as element 313 for RecordManager and element 315 for the BTREE index, as well as any other indexes that may be defined). BlockManager provides methods (AllocateControlArea and DeallocateControlArea) that permit users of the store (e.g. subclasses) to allocate and deallocate control area space during construction and destruction, respectively. The amount of space required is specified as a parameter on the allocate method (which then returns an allocated area). The deallocate method is invoked using a previously-allocated instance of a control area, and will preferably be invoked by a destructor method of a BlockManager subclass as the subclass instance is deallocating its objects.

Both the BTREE and the RecordManager use the same underlying store ("R", in this case). Each subclass of BlockManager has an attribute or method that enables it to know how much space it requires for storing its state information. Thus, when RecordManager allocates its space, it invokes the AllocateControlArea method using this space requirement.

At Block 410, the BTREE constructor allocates the space it needs by invoking the AllocateControlArea method, and then proceeds to initialize itself.

The control area data for a BTREE index 315 comprises three important fields: the location of the root node (some numeric value, rn), the key length, and the BTREE degree. The root node value rn gives the address of the BlockManager block that serves as the BTREE root node. Initially, all control area space is cleared to zeros. Once the control area for a file has been allocated and used to store state information, the control area continues to persist along with the file contents. Thus, the first time this constructor is called (for this particular instance of a store), the root node value rn is zero, indicating that no root node has been assigned. Therefore, the constructor method must initialize the BTREE control area 315. Block 420 checks to see if a new index is to be created by testing the value of rn. When Block 420 has a negative result (i.e. value rn is non-zero), then there is already an existing BTREE index within the file, so control transfers to Block 460; otherwise, processing continues at Block 430.

At Block 430, the process of creating a new BTREE index begins by computing the degree D of the BTREE. Normally, the degree of a B-tree is an input parameter for B-tree processing. However, for ensuring efficient access with the BTREE of the present invention, the preferred embodiment will force a single BlockManager block to be exactly one BTREE node. (This avoids the need to provide code for dealing with situations where one index node spans multiple blocks, and may span a page boundary: when this can happen, code must be written that ensures that all required pages are in memory when needed.) Thus, the degree will be calculated according to the size of the blocks in the current store. The degree of a tree-structured index, including the BTREB index of the preferred embodiment, pertains to how many keys can be stored in a single BTREE node. Each internal node in the BTREE index can have a maximum of (2*D)–1 keys and (2*D) child node pointers. As indicated at Block 400, a key object K is passed as a parameter for BTREE index construction. K contains the key length KL as an attribute. Each BTREE node includes a small control area to mark whether the node is a leaf node or an intermediate node, as well as other details that depend on the particular type of BTREE being used. Therefore, given the block length BL of the store R, key length KL from key object K, and node control area of length C, the degree D of the BTREE index can be computed according to the following equation:

$$D = \left\lfloor \frac{R.BL - C + K.KL}{2*(K.KL+4)} \right\rfloor$$

For a BTREE with a given key length KL to be feasible for the given inherited store R, it must be possible for a node to contain at least one key. Thus, Block 440 checks to see if D is at least 1. If this test has a negative result, then the index cannot be created, and an error exception will be thrown at Block 480. Otherwise, feasibility is ascertained, and the root node is allocated as a data block from R by invoking the RecordManager's allocate method at Block 450. The root node value rn is then set to the address returned by the allocate method.

Block 460 is reached during the process of creating a new BTREE index, and also when a BTREE index is already embedded within a data file. This latter situation occurs when an executing program is using an already-existing file. Block 460 registers the BTREE index with the RecordManager by invoking the method registerIndex. This registration enables the current instantiation of the RecordManager object to know where this BTREE index information is located, so that the index can be accessed appropriately by the RecordManager when records are read, written, and deleted. The result of this registration is illustrated by the arrow line 314 in FIG. 3.

After the store 300 has been created, it will be populated with records and the index will grow and shrink as records are added and deleted from the store, respectively. Accordingly, the root node will change from one block to another as the BTREE is rebalanced. (This rebalancing uses techniques which are known in the art and do not form part of the present invention. As will be obvious, the root node value rn may change during this rebalancing process, so that the control area always indicates the current root node.) When an instance of RecordManager is being created for use by an executing program, and the record store R to which this RecordManager instance pertains is a store that already exists (that is, it contains data and index blocks from a previous program execution), the control area allocation process of Block 410 will instantiate state information that has been saved from a previous instance. In this case, the "No" branch will be taken at Block 420 because the value rn will be non-zero, corresponding to the prior value of the root node's location. All that is needed in this situation is to register the existing BTREE index with the current RecordManager by performing the processing at Block 460.

When Block 460 completes, the BTREE index allocation is complete and control returns to the invoking code as shown at Block 470.

The process of updating an index when a new record is added to R or updated within R begins by invoking the logic shown in FIG. 5 beginning at Block 500. Whenever a record is written to blocks of the store R (whether it is a new record or an updated record), the index is updated with the record's key and address. At Block 510, a record currently stored in a buffer DB (data buffer) with length DL (data length) is written to record store R by invoking the method "writeRecord". In the preferred embodiment, writeRecord is a method of the class RecordManager. A record address RA is returned if the write succeeds. Block 520 checks to see if the write was successful, and processing continues at Block 530 if so. When Block 520 has a negative result, control transfers to Block 590 where an error is returned indicating that the write operation failed. Note that the specific technique for checking the outcome of the write operation at Block 520 may vary depending on a particular implementation. For example, an unsuccessful result may be determined by catching a thrown exception, by detecting an invalid value for the returned record address (such as "−1"), etc.

When control reaches Block 530, the write operation was successful. The key value (KV) of the record is then computed by invoking the computeKeyValue method of the key object K. The data buffer DB and data length DL are passed as parameters to this method invocation. This method sets the attribute KV within object K to the computed key value. The method is preprogrammed with a specific technique for deriving the key value for each record stored in R. For example, a key value may correspond to the value of a particular fixed length field located at an offset within each record, such as the employee number field of employee records. Or, the key value derivation may use a computation such as hashing a 32-bit CRC value computed over the entire record instance.

After the key value KV is computed, the record address RA of key object K is set in Block 540 to the record address returned from the writeRecord method invocation of Block 510. The key object K now contains a key value and its corresponding record address. At Block 550, the BTREE method insertIndex is called to insert key object K into the BTREE index B. This method will be written using techniques which are known in the art, and which are adapted to the particular variety of BTREE being used. If the insert is successful, the test at Block 560 has a positive result, and a successful return code is returned to the invoking logic at Block 570. However, if the insertion into the index is not successful, control transfers to Block 580 where the data record at address RA is deleted from the record store R in order to keep the data file and its index synchronized. An error is then returned by Block 590, indicating that the write operation failed. An index update may be unsuccessful, for example, if a BTREE node split is required and there are no available blocks left in record store R.

The process of reading a record using the embedded index of the present invention begins by invoking the logic of FIG. 6 at Block 600. The main objective of using a file index is to enable rapid retrieval of records in the store using a key, as previously discussed. Assuming that key value K.KV has been set to the desired key value for which the index search will be performed prior to invoking the process of FIG. 6, Block 610 searches the index B using the BTREE's searchIndex method with the key object K as a search parameter. If the key is not in the index, Block 620 has a negative response and a "not-found" indication is returned to the invoking code at Block 680. The process of FIG. 6 then ends. If the key is found, however, Block 620 has a positive result, and the process of returning the associated record continues at Block 630. At Block 630, the record address (RA) corresponding to key value KV is retrieved from the key object K using the "getRA()" method of key object K. RA is used at Block 640 to construct a new record object, Rk. The creation of Rk entails allocating buffer space in which the record will be stored, and attempting to read the record from the record store R into the buffer. If this succeeds, Block 650 has a positive result and the new record object Rk is returned to the invoking code at Block 660. Otherwise, Block 650 has a negative result and an exception is thrown at Block 670 to notify the caller of the error in the read operation. (Note that occurrence of this error represents a serious error condition: since the record key was located in the index, the record should also exist in the record store. In contrast, the notification at Block 680 is not an error but merely an indication that the searched-for record did not exist in record store R.)

The process of deleting a record using the embedded index of the present invention is shown in FIG. 6. When the RecordManager deletes (deallocates) the record, its associated index entry must also be deleted. Block 600 shows a representative syntax for the delete operation, where a method of RecordManager is invoked with parameters DB (the record to be deleted, stored in a data buffer "DB") and DL (the data length). Block 710 creates a key object with the key value (KV) computed by the key's key generation method, computeKeyValue (which also uses the parameters DB and DL). Block 720 then searches the index using the key object, by invoking the BTREE searchIndex method, to retrieve the record's address.

Block 730 asks whether the key from the key object was found in the index. If not, control transfers to Block 740, where a "Not found" indication is returned to the invoking logic. Note that this is not an error condition, but merely means that the record will not be deleted because it does not exist in the record store. If Block 730 has a positive response, then the key was found in the index, so a record address was located corresponding to the key value. Block 750 proceeds to extract that record address from the key object. At Block 760, the deallocateRecord method of RecordManager is called, using this record address as a parameter. This method invocation will free up the blocks allocated to the record, returning them to the free space list (or other construct that may be used for keeping track of free space). Block 770 then invokes the BTREE deleteKey method to delete the index entry corresponding to key object K, and control returns to the invoking code at Block 780.

Related functions that operate on the persistent store include "flush" and "sync pointing". To ensure integrity of the store, all buffers must be written to disk when the store is in a reset state. This is referred to as the flush operation, and entails writing out all the in-memory pages that correspond to data or index blocks of the persistent store that have been updated. A method "R.flush( )" is defined in class RecordManager (or may be inherited from BlockManager), as stated earlier, to perform this function on record store R. This method is implemented using techniques which are well known in the art, the details of which do not form part of the present invention. The embedded index of the present invention guarantees that if the flush operation is successful, the BTREE index will be up-to-date (i.e. synchronized) with respect to the data records within the store. For transaction processing, a one- or two-phase commit syncpoint protocol is necessary to guarantee the integrity of persistent transaction data. This is referred to as the sync point operation. This invention does not require changes to a syncpoint function. However, because the index and data blocks are maintained in the same store, various syncpoint functions (e.g., logging, prepare, commit, rollback) that are applied to the record store R automatically handle the index integrity as well as the data integrity. That is, when global file operations (such as flushing the file, closing the file, or taking a checkpoint) complete successfully, then the entire record store is in a consistent state where the index and the data are synchronized. This may be considered as ensuring integrity at the file level. Transaction processing semantics to implement integrity at the file level for the operations that were shown in FIGS. 4–7 can easily be added, using techniques which are known in the art. Preferably, the information used to log the state of the transaction (i.e. the global file operation) will be stored in the control area of the persistent store (element 305 of FIG. 3).

In an optional enhancement of the preferred embodiment, integrity can be provided at the record level. In the preferred embodiment which has been described above, the index and data are synchronized at the file level when a global file operation (e.g. flush or close) completes successfully. However, if a system failure (e.g., machine turned off) occurs during normal processing, then the index and data can become unsynchronized because some but not all of the updated blocks for the data and/or index may have been written to disk. The only solution in this case is to restore an earlier version of the file.

High integrity requirements are often met by implementing applications to use robust database systems that support two-phase commit protocols. However, there are classes of applications that have some high integrity requirements but do not require the richness and the overhead of a full function database management system. This optional enhancement to the preferred embodiment extends the logic of the preferred embodiment by adding support to implement atomicity at the record level for the write and delete operations. That is, either the write (or delete, as appropriate) operation will complete successfully or the store will be restored to its previously consistent state during recovery.

This optional enhancement operates by ensuring that, before any blocks in the store are updated as a consequence of a writeRecord or deleteRecord operation, information is persistently saved so that the original block contents can be restored during a recovery operation in the event of random failure (excluding media failures). That is, weprepare the data that is to be used for recovery. The existence of persistent storage that can be used to persistently save the prepare data is assumed. The term prepare store is used to refer to this storage. The prepare store could be another file, a partition (i.e., a predefined set of blocks) of the store allocated for R, or flash memory. The state of the record store is updated to indicate the state of the transaction (i.e. the record-level operation). As in the preferred embodiment, this state information is preferably stored in the control area of the persistent store (element 305 of FIG. 3).

One new method is added to BlockManager for this enhancement, and will be referred to as getBlockNumberList(DL). Assume the BlockManager control area contains a pointer to a chain of free blocks. Given a data length, DL, getBlockNumberList returns a list (array) of block numbers of the blocks that would be allocated if DL data bytes were to be stored. This method does not change any content of the store. Note: the next available block can always be queried by setting DL=1.

Five new methods are added to RecordManager: CreatePrepareRecordForWrite, CreatePrepareRecordForDelete, Prepare, Restore, and Reset. The constructor method of RecordManager is changed in this enhancement, to detect whether the record store R is in a consistent state upon opening the store and to proceed accordingly. These added methods will now be described, and the changed constructor method will be described below with reference to FIG. 9.

CreatePrepareRecordForWrite(DL): This methods calls getBlockNumberList to get a list of block numbers of blocks that would be allocated to obtain the space required for a particular write operation. An integer array is returned where the first element is the prepare record type (i.e., write), the second element contains the number of blocks in the list, and the remaining elements contain the block numbers.

CreatePrepareRecordForDelete(RA): This methods accepts a record address as its input argument. It returns an integer array where the first element is the prepare record type (i.e., delete), the second element contains the number of blocks in the list, and the remaining elements contain the block numbers of the blocks allocated to the record.

Prepare( ): This method writes out the store control area (see element 305 in FIG. 3) and the created RecordStore and BTREE prepare records (i.e. the information obtained by invocation of methods CreatePrepareRecordForWrite and CreatePrepareRecordForDelete) to the prepare store. The state of the record store is set to "prepared."

Restore( ): The restore method is only called when the state of the record store is in the "prepared" or "restore pending" state. First, this method sets the store state to "restore pending." Next, it reads the prepare records from the prepare store and backs out the changes which may have been made to the indicated blocks. If the prepare record type is "write", this comprises returning all the blocks designated in the prepare record to the free-chain. The BTREE prepare record (created by the method CreatePrepareRecordForWrite in the BTREE class, as described below) contains a copy of all blocks that will be modified by the BTREE key insert operation. These blocks are read from the prepare store and written to the record store. When all these blocks have been written, the index is backed out to a consistent state. After the BTREE prepare record has been processed, the record store state is set to "reset" and the prepare store is reset to empty.

Reset( ): This method causes the store to be reset in a consistent state. First, the state in the control area is set to reset (in memory). Next, R.flush( ) is issued to flush all buffers to disk. Finally, temporary resources that were allocated to accomplish the prepare processing are deallocated. These resources include the prepare records that were created for the record data and the BTREE index. The prepare store is reset to empty.

Two new methods are added to the BTREE class: CreatePrepareRecordForWrite and CreatePrepareRecordForDelete.

CreatePrepareRecordForWrite(K): This method first creates a list of blocks that would be modified if the key K is inserted in the index. The simplest case is where the key insertion adds an entry to a single block (node). In this case the list contains one entry—the block number of the updated block. The most complicated case is where the insertion of K causes nodes to split all the way up to and including the root node. This method simulates the insertion of a key in the BTREE without actually modifying any of the actual BTREE nodes. It uses BlockManager's getBlockNumberList method to determine the next free block numbers. After a list of block numbers of the "would be" modified block(s) is constructed, each block is read from the record store and written to the prepare store. Normally, only a single block is read/written because splits occur relatively infrequently unless the degree is very low.

CreatePrepareRecordForDelete(K): This method is similar to the above except that a key is removed from a BTREE instead of inserted. A list of the "would be" modified block(s) is constructed by this BTREE method simulating the changes that would occur if the key were deleted. All identified nodes are written to the prepare store.

Figure 8:
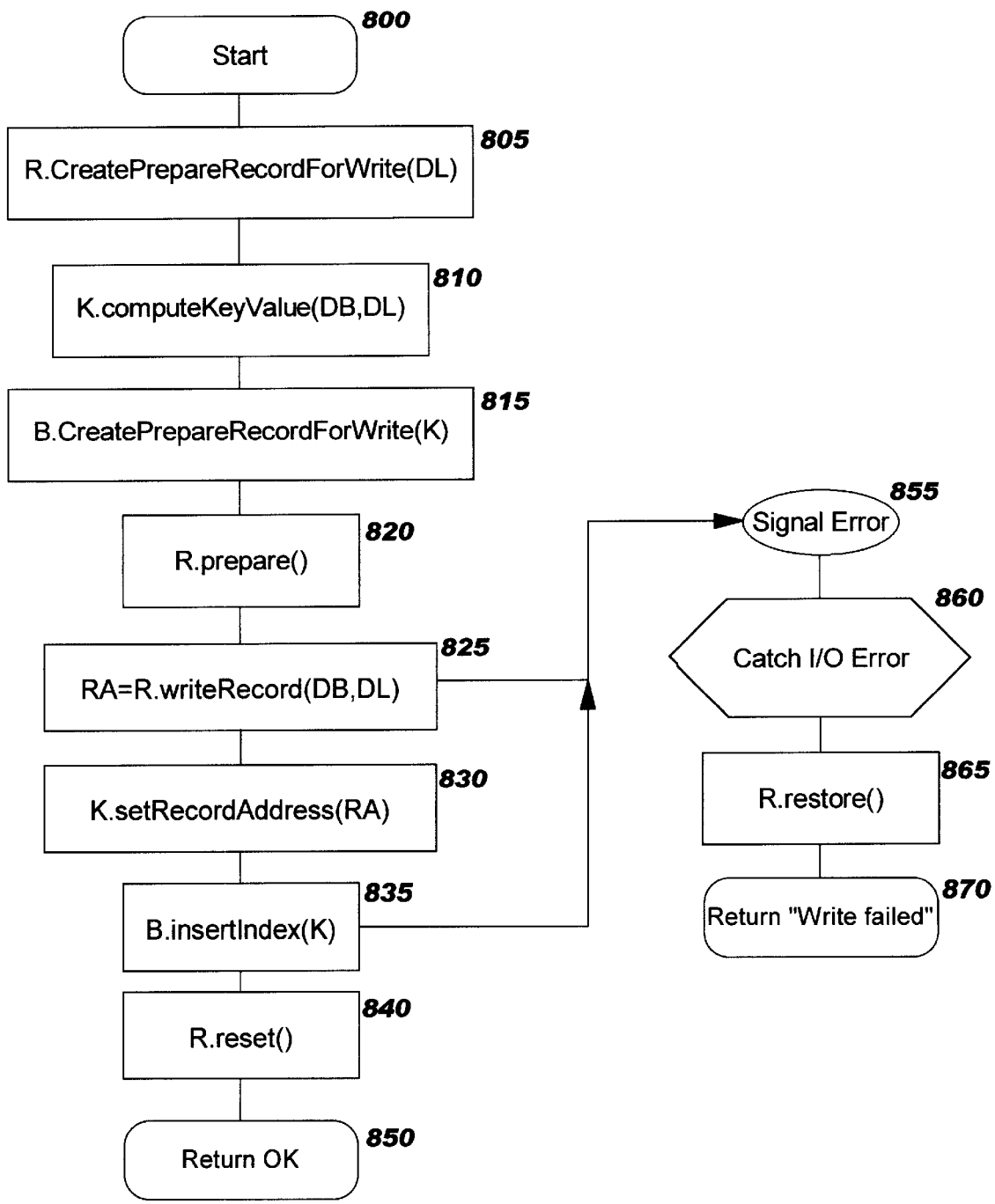
FIGS. 8–9 illustrate flow charts which set forth logic that may be used with an optional enhancement to the preferred embodiment.
Figure 9:
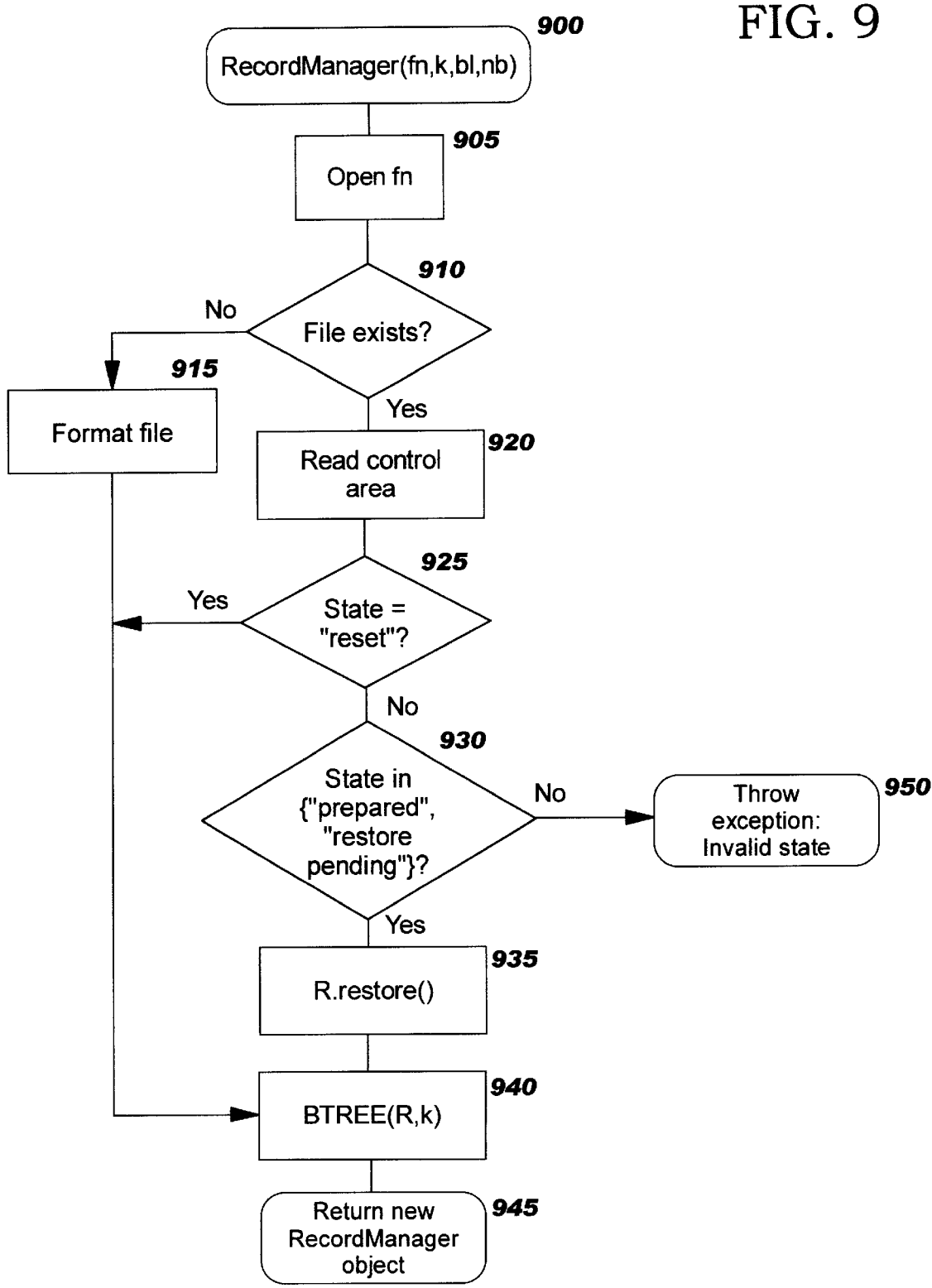

FIGS. 8 and 9 show the logic of the atomic write operation and of the enhanced RecordManager constructor operation, respectively.

The write operation of this optional enhancement to the preferred embodiment is a replacement for the logic depicted in FIG. 5, and is shown as beginning at Block 800 of FIG. 8. At Block 805, the CreatePrepareRecordForWrite method of RecordManager is invoked, passing as an argument the data length, DL, of the record that is to be written. This method returns an integer array, as discussed above. Block 810 then calls the computeKeyValue method, in an identical manner to that described previously for Block 530 of FIG. 5. Block 815 invokes the CreatePrepareRecordForWrite method of BTREE class, passing the key object K as an argument. Operation of this method is as described above in the discussion of new methods for the optional enhancement.

Block 820 invokes the prepare method of RecordManager, which causes the data in the prepare store to be updated to reflect the state of the write operation. This method was described above, and includes writing the prepare records that result from operation of Blocks 805 and 815 to the prepare store. Block 825 then invokes the writeRecord method, and is analogous to the invocation described for Block 510 of FIG. 5. If an error occurs during this process, control will transfer to Block 855; otherwise, processing continues to Block 830 where the setRecordAddress method is invoked. In Block 830, the record address RA of key object K is set to the record address obtained in Block 825. The processing of Block 830 is analogous to that of Block 540 in FIG. 5.

Block 835 inserts the key object K into the BTREE index B, as described for Block 550 of FIG. 5. If an error occurs during this insertion, control will transfer to Block 855; otherwise, processing continues at Block 840. Block 840 invokes the reset method of RecordManager. The reset method operates as described above in the discussion of new methods. Following completion of Block 840, the atomic write operation has successfully completed. The information that was stored in the prepare store to log the state of the transaction has been removed, the updated records have been flushed to disk, and the state has been set to "reset" to indicate that the store is in a consistent state. Block 850 then returns control to the invoking logic, indicating the success of the write operation.

If control reaches Block 855, an error occurred during the atomic write process. An error will be signaled, and control will transfer to Block 860. Block 860 is also reached for other I/O errors that may be thrown (for example, by Block 480 of FIG. 4 or Block 670 of FIG. 6), which indicate that the store is not in a consistent state and needs to be restored to a prior state which was consistent. This is done by invoking the restore method of RecordManager at Block 865, which has been described above. Following completion of Block 865, Block 870 returns control to the invoking logic with an indication that the atomic write operation failed.

Implementation of the logic for deleting a record and its index from record store R will also be implemented as an atomic operation in this optional enhancement. This logic requires minimal changes from the logic of the atomic write operation shown in FIG. 8. The methods invoked at Blocks 805 and 815 for classes RecordManager and BTREE, respectively, will be replaced by invocation of the CreatePrepareRecordForDelete methods (which were described earlier). The operation of Block 825 will be replaced by invocation of the searchIndex method, and is analogous to the processing described for Block 720 of FIG. 7. Block 830 will be replaced by invocation of the getRA method, as described for Block 750 of FIG. 7. Block 835 will be replaced by invocation of methods deallocateRecord and deleteKey, as described for Blocks 760 and 770 of FIG. 7. Finally, the error indications in Blocks 855 and 870 are modified to indicate that the operation encountering an error is a delete operation.

FIG. 9 depicts the logic with which the constructor method of RecordManager is preferably implemented in this optional enhancement of the preferred embodiment. This enhanced constructor method uses the record-level state information stored during operation of the logic of FIG. 8. If a system crash occurs during an atomic write or delete operation, this constructor method will be invoked when the system is restarted. (This method is also invoked upon instantiating a RecordManager for processing the record store in the absence of a crash.) The constructor process is invoked with a number of arguments, as depicted at Block 900. Argument "fn" is the name of the file to be opened; "k" represents the key object with which records in the record store will be accessed; "bl" is the block length of the fixed-size blocks in the file; and "nb" is the number of such fixed-size blocks in the file. Block 905 opens the file having name "fn". At Block 910, a test is made to determine whether this file exists. If not, then it can be inferred that this is a request for a new file, and control transfers to Block 915 which formats the file according to the arguments on the constructor invocation. This process comprises allocating and initializing a control area (as depicted by element 305 of FIG. 3), and allocating the requested number of blocks each having the requested fixed size. When Block 915 completes, control transfers to Block 940.

If the test at Block 910 has a positive response (i.e. the named file already exists), then Block 920 reads the control area of this file. In particular, the stored state information is read. Block 925 asks whether the state is "reset". If so, then the data and its index are in a consistent (i.e. synchronized) state, and control transfers to Block 940. If the state is not "reset", then Block 930 asks whether it is one of "prepared" or "restore pending". If this test has a negative response, then the state is invalid and an exception will be thrown at Block 950. When Block 930 has a positive response, this is an indication that an atomic write or delete operation did not complete successfully, and that the data and index are therefore not in a consistent state. Therefore, Block 935 invokes the restore method (described above in the description of new RecordManager methods) to restore the file contents to a prior consistent state.

Block 940 is reached following the formatting of a new file (from Block 915), when the file is in a consistent state (from Block 925), and after the file has been restored to a consistent state (by Block 940). The function of Block 940 comprises invoking the BTREE constructor method, as depicted in FIG. 4. Block 945 then returns the newly-created RecordManager object to the invoking code, after which the processing of FIG. 9 ends.

The preferred embodiment was described above in terms of embedding a single primary index within a data store. However, the logic is easily extended to add one or more secondary indexes. Secondary indexes have the property that their keys are not unique, as previously discussed. This can be handled by using one or more intermediate blocks to provide a level of indirection to the data records indexed by the secondary key. The record address RA within a key object for the secondary key value would reference one or more blocks that contains a set of record addresses: RA1, ... RAn. Additional control information would also be needed in control area 305 to distinguish primary from secondary indexes.

While the preferred embodiment was described using an embedded BTREE within a single-level store, the same approach would apply for other types of key mapping algorithms such as hash tables. For example, at the risk of wasting some disk space, a sparse persistent hash table could be implemented over multiple blocks of the store. As collision chains grow and shrink, store blocks could be allocated and freed as needed. The value of this approach is that a large hash table with low collision rates could be implemented without having to commit large chunks of main memory. Those blocks that were frequently referenced would remain in paging memory.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. Computer readable code readable by a computer system in a computing environment for increasing efficiency of indexing random-access files, the computer readable code embodied on computer readable media and comprising:

a subprocess for storing data records in a random-access file, said file comprising a control area and a plurality of fixed-length blocks, wherein each of said data records is stored as one or more of said fixed-length blocks;

a subprocess for creating an embedded index for said file, wherein said index is stored as one or more of said fixed-length blocks which are distinct from fixed-length blocks used to store said data records;

a subprocess for updating said index; and a subprocess for using said index to retrieve a selected one of said stored data records; wherein said subprocess for updating is invoked each time said subprocess for storing completes successfully, and wherein said subprocess for updating further comprises:

a subprocess for computing a key value for said data records;

a subprocess for storing said computed key value in a key object;

a subprocess for storing an address where said data record was stored in said key object; and a subprocess for inserting said key object into said index; and further comprising a subprocess for deleting said stored data record from said file if said subprocess for inserting encounters an error.

2. Computer readable code for increasing efficiency of indexing random-access files according to claim 1, further comprising:

a subprocess for allocating an index control area for said index within said control area of said random-access file; and a subprocess for storing an address of said index in said index control area.

3. Computer readable code for increasing efficiency of indexing random-access files according to claim 1, wherein said subprocess for using said index further comprises:

a subprocess for comparing selected ones of said inserted key objects to a record key of said selected record;

a subprocess for returning a not-found indication when none of said selected key objects contains said record key; and a subprocess for reading said selected record from said random-access file using said stored address in a matching one of said selected key objects when said matching one contains said record key.

4. Computer readable code for increasing efficiency of indexing random-access files according to claim 1, further comprising a subprocess for deleting a particular record from said random-access file, wherein said subprocess for deleting further comprises:

a subprocess for removing an associated key object from said index; and a subprocess for deallocating one or more blocks associated with said particular record.

5. Computer readable code for increasing efficiency of indexing random-access files according to claim 4, further comprising:

a subprocess for creating a first delete-prepare record to store information related to said subprocess for deallocating;

a subprocess for creating a second delete-prepare record to store information related to said subprocess for removing;

a subprocess for storing said first and second delete-prepare records in a persistent prepare store;

a subprocess for resetting said prepare store when said subprocess for deallocating and said subprocess for removing complete successfully; and a subprocess for restoring said file when a file error occurs.

6. Computer readable code for increasing efficiency of indexing random-access files according to claim 1, wherein said index is a tree-structured index.

7. Computer readable code for increasing efficiency of indexing random-access files according to claim 6, wherein said tree-structured index is a B-Tree index.

8. Computer readable code for increasing efficiency of indexing random-access files according to claim 1, further comprising:

a subprocess for creating a first write-prepare record to store information related to said subprocess for storing;

a subprocess for creating a second write-prepare record to store information related to said subprocess for updating;

a subprocess for storing said first and second write-prepare records in a persistent prepare store;

a subprocess for resetting said prepare store when said subprocess for storing and said subprocess for updating complete successfully; and a subprocess for restoring said file when a file error occurs.

9. A system for increasing efficiency of indexing random-access files in a computing environment, comprising:

a random-access file, said file comprising a control area and a plurality of fixed-length blocks;

means for storing data records in said file, wherein each of said data records is stored as one or more of said fixed-length blocks;

means for creating an embedded index for said file, wherein said index is stored as one or more of said fixed-length blocks which are distinct from fixed-length blocks used to store said data records;

means for updating said index; and means for using said index to retrieve a selected one of said stored data records; wherein said means for updating is invoked each time said means for storing completes successfully, and wherein said means for updating further comprises:

means for computing a key value for said data record;

means for storing said computed key value in a key object;

means for storing an address where said data record was stored in said key object; and means for inserting said key object into said index; and further comprising means for deleting said stored data record from said file if said means for inserting encounters an error.

10. The system for increasing efficiency of indexing random-access files according to claim 9, further comprising:

means for allocating an index control area for said index within said control area of said random-access file; and means for storing an address of said index in said index control area.

11. The system for increasing efficiency of indexing random-access files according to claim 9, wherein said means for using said index further comprises:

means for comparing selected ones of said inserted key objects to a record key of said selected record;

means for returning a not-found indication when none of said selected key objects contains said record key; and means for reading said selected record from said random-access file using said stored address in a matching one of said selected key objects when said matching one contains said record key.

12. The system for increasing efficiency of indexing random-access files according to claim 9, further comprising means for deleting a particular record from said random-access file, wherein said means for deleting further comprises:

means for removing an associated key object from said index; and means for deallocating one or more blocks associated with said particular record.

13. The system for increasing efficiency of indexing random-access files according to claim 12, further comprising:

means for creating a first delete-prepare record to store information related to said means for deallocating;

means for creating a second delete-prepare record to store information related to said means for removing;

means for storing said first and second delete-prepare records in a persistent prepare store;

means for resetting said prepare store when said means for deallocating and said means for removing complete successfully; and means for restoring said file when a file error occurs.

14. The system for increasing efficiency of indexing random-access files according to claim 9, wherein said index is a tree-structured index.

15. The system for increasing efficiency of indexing random-access files according to claim 14, wherein said tree-structured index is a B-Tree index.

16. The system for increasing efficiency of indexing random-access files according to claim 9, further comprising:

means for creating a first write-prepare record to store information related to said means for storing;

means for creating a second write-prepare record to store information related to said means for updating;

means for storing said first and second write-prepare records in a persistent prepare store;

means for resetting said prepare store when said means for storing and said means for updating complete successfully; and means for restoring said file when a file error occurs.

17. A method for increasing efficiency of indexing random-access files in a computing environment, comprising the steps of:

storing data records in a random-access file, said file comprising a control area and a plurality of fixed-length block, wherein each of said data records is stored as one or more of said fixed-length blocks;

creating an embedded index for said file, wherein said index is stored as one or more of said fixed-length blocks which are distinct from fixed-length blocks used to store said data records;

updating said index; and using said index to retrieve a selected one of said stored data records; wherein said updating step is invoked each time said storing step completes successfully, and wherein said updating step further comprises the steps of:

computing a key value for said data record;

storing said computed key value in a key object;

storing an address where said data record was stored in said key object; and inserting said key object into said index; and further comprising the step of deleting said stored data record from said file if said inserting step encounters an error.

18. The method for increasing efficiency of indexing random-access files according to claim 17, further comprising the steps of:

allocating an index control area for said index within said control area of said random-access file; and storing an address of said index in said index control area.

19. The method for increasing efficiency of indexing random-access files according to claim 17, wherein said using said index step further comprises the steps of:

comparing selected ones of said inserted key objects to a record key of said selected record;

returning a not-found indication when none of said selected key objects contains said record key; and reading said selected record from said random-access file using said stored address in a matching one of said selected key objects when said matching one contains said record key.

20. The method for increasing efficiency of indexing random-access files according to claim 17, further comprising the step of deleting a particular record from said random-access file, wherein said deleting step further comprises the steps of:

removing an associated key object from said index; and deallocating one or more blocks associated with said particular record.

21. The method for increasing efficiency of indexing random-access files according to claim 20, further comprising the steps of:

creating a first delete-prepare record to store information related to said deallocating step;

creating a second delete-prepare record to store information related to said removing step;

storing said first and second delete-prepare records in a persistent prepare store;

resetting said prepare store when said deallocating step and said removing step complete successfully; and restoring said file when a file error occurs.

22. The method for increasing efficiency of indexing random-access files according to claim 17, wherein said index is a tree-structured index.

23. The method for increasing efficiency of indexing random-access files according to claim 22, wherein said tree-structured index is a B-Tree index.

24. The method for increasing efficiency of indexing random-access files according to claim 17, further comprising the steps of:

creating a first write-prepare record to store information related to said storing step;

creating a second write-prepare record to store information related to said updating step;

storing said first and second write-prepare records in a persistent prepare store;

resetting said prepare store when said storing step and said updating step complete successfully; and restoring said file when a file error occurs.

* * * * *